July 25, 1967  A. L. MORASKI  3,332,388
COMBINATION AUTOMOBILE BARGE AND TRAILER
Filed Oct. 22, 1965  3 Sheets-Sheet 1
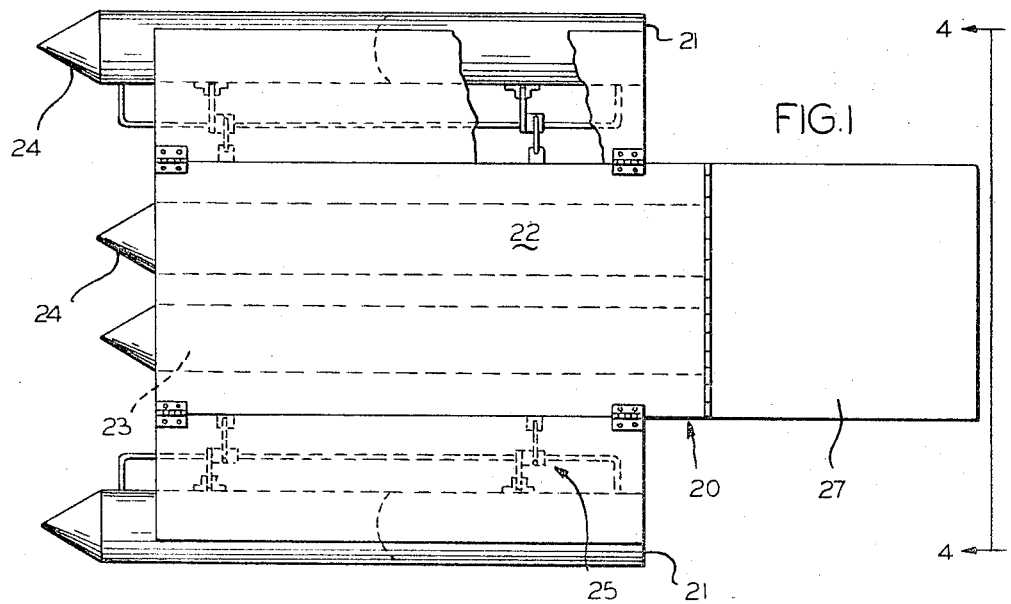
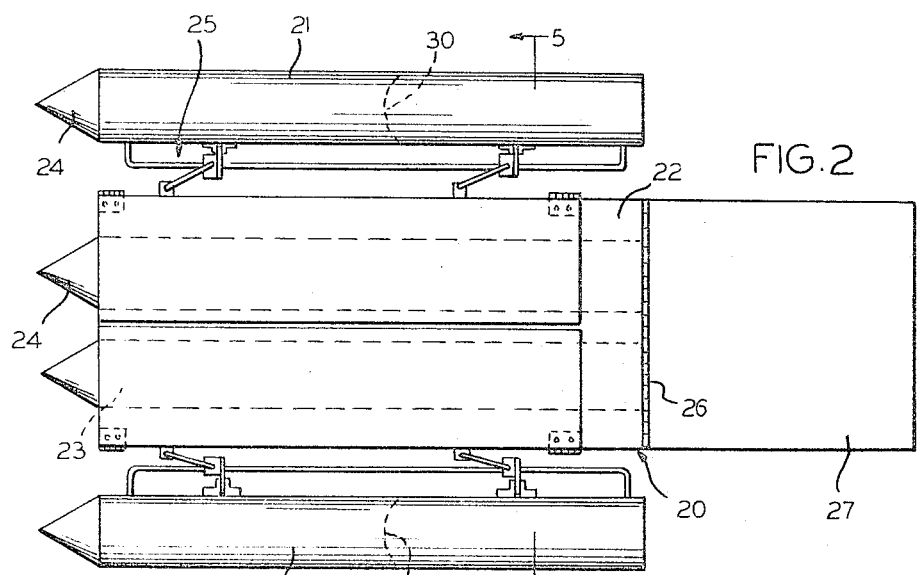
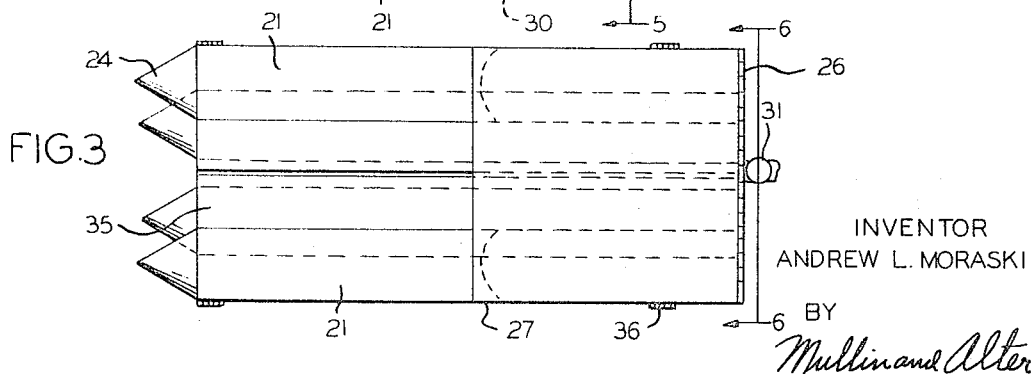
INVENTOR
ANDREW L. MORASKI
BY
*Mullin and Alter*
ATTORNEYS July 25, 1967   A. L. MORASKI   3,332,388
COMBINATION AUTOMOBILE BARGE AND TRAILER
Filed Oct. 22, 1965   3 Sheets-Sheet 2

INVENTOR
ANDREW L. MORASKI
BY
Mullin and Alter
ATTORNEYS

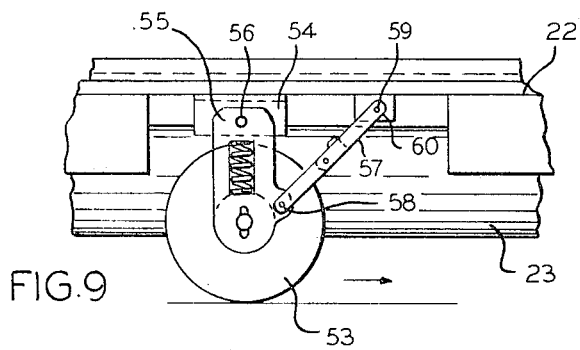
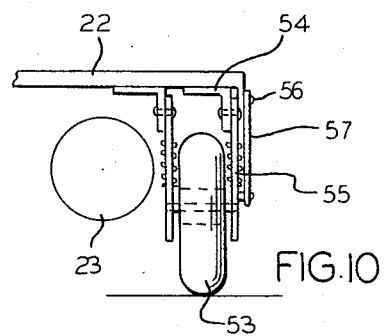
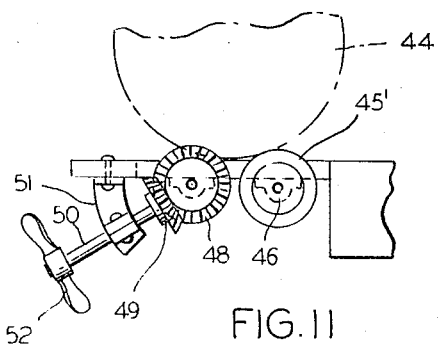
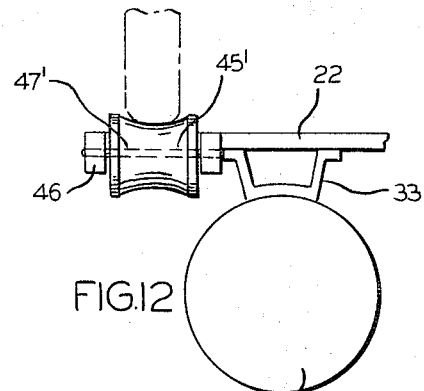
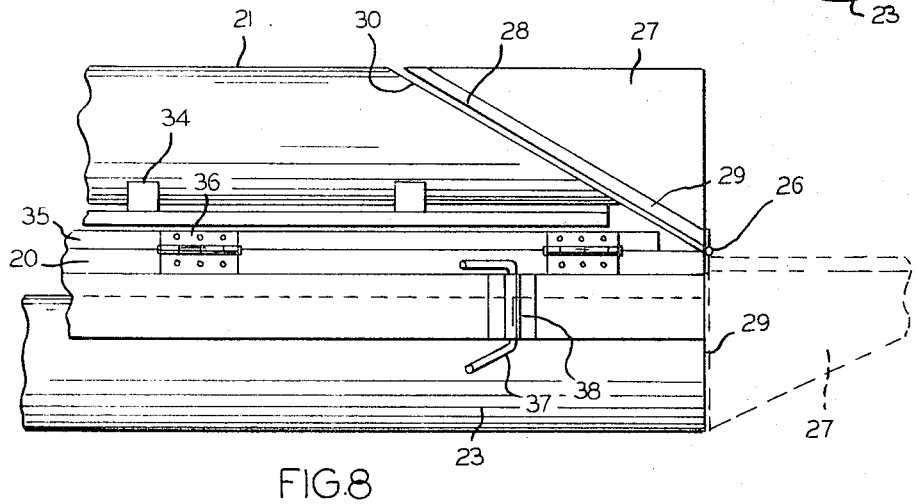

United States Patent Office 3,332,388
Patented July 25, 1967

1

3,332,388
COMBINATION AUTOMOBILE BARGE AND TRAILER
Andrew L. Moraski, 1901 S. 6th St.,
Milwaukee, Wis. 53204
Filed Oct. 22, 1965, Ser. No. 501,296
1 Claim. (Cl. 115—.5)

ABSTRACT OF THE DISCLOSURE

Includes main platform with hingedly associated side floats and platforms to increase buoyancy. Main platform has wheels associated therewith in order that vehicle can be used as trailer. Also, drive means and steering means are operatively associated with the main plate in order that the rear wheels of an automobile may be positioned so that rotation thereof causes rotation of a propeller on a vehicle and in turn drives the vehicle. The steering means are operatively associated with the front wheels of an automobile in order that when turning of the front wheels of the automobile occurs a responsive turning of the steering means occurs to change the direction of the combination automobile barge and trailer when the same is being used as a barge.

This invention relates to a combination automobile barge and trailer and, more particularly, to an automobile barge operated by the automobile while being conveyed across a body of water.

The prime object of my invention is to provide an automobile barge that may be folded into a compact unit to be towed by the automobile as a trailer.

Another object of my invention is to provide a device of the character described, that is adjustable in width to provide additional buoyancy.

A further object of my invention is to provide a device that is equipped with a buoyant loading and unloading member forming a part of the barge.

It is manifest to anyone familiar with the art that various barges heretofore used carry an automobile and permit the automobile to be used as a driving and steering means. However, it has been proven that the weight of the automobile resting on the top surface of the barge will have a tendency to make the assembly "top heavy," and it is the purpose of my invention to spread the floating barge to a greater width to overcome this hazard.

Then too, with the existing equipment, it is necessary to mount the automobile barge to a trailer of conventional design, which trailer by necessity must be left on shore at the loading point, making it imperative to return to the original loading point.

With the device described, illustrated and claimed herein, the barge itself acts as a trailer and may be loaded and conveyed to and from any other point, as an integral unit.

Other and further objects of my invention will become more apparent as the description proceeds when taken in conjunction with the drawings in which:

FIG. 1 is a top or plane view of the assembled automobile barge and trailer embodying the principles of the invention, extending outward for maximum buoyancy, and showing the main loading platform in an open position;

FIG. 2 is a similar view with the side floats brought inward toward the body;

FIG. 3 is a top view of the automobile barge and trailer folded as a compact unit, when being towed by the automobile;

2

Figure 4:
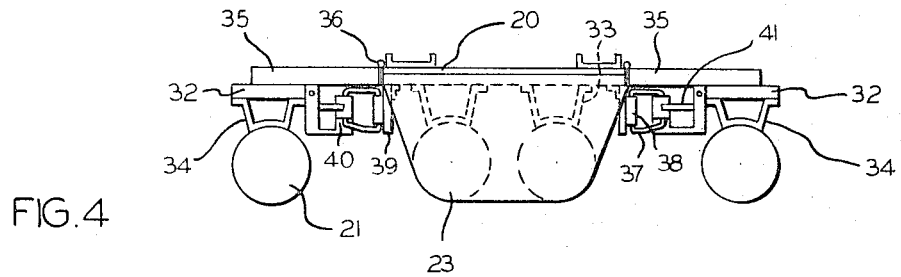
Figure 5:
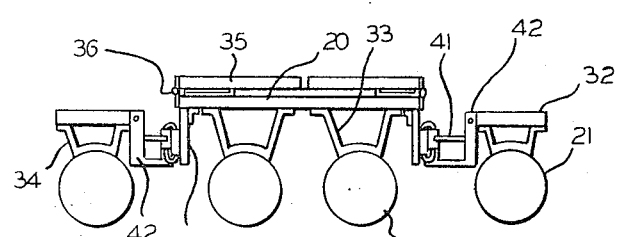
Figure 6:
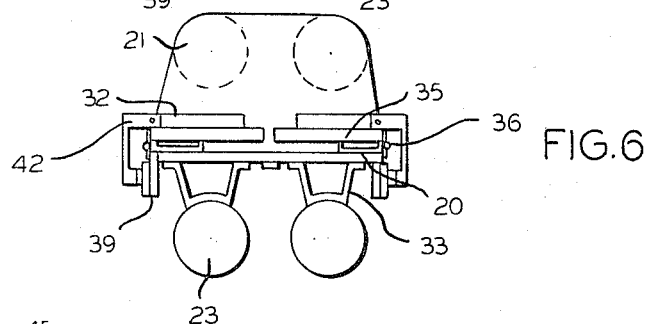
Figure 7:
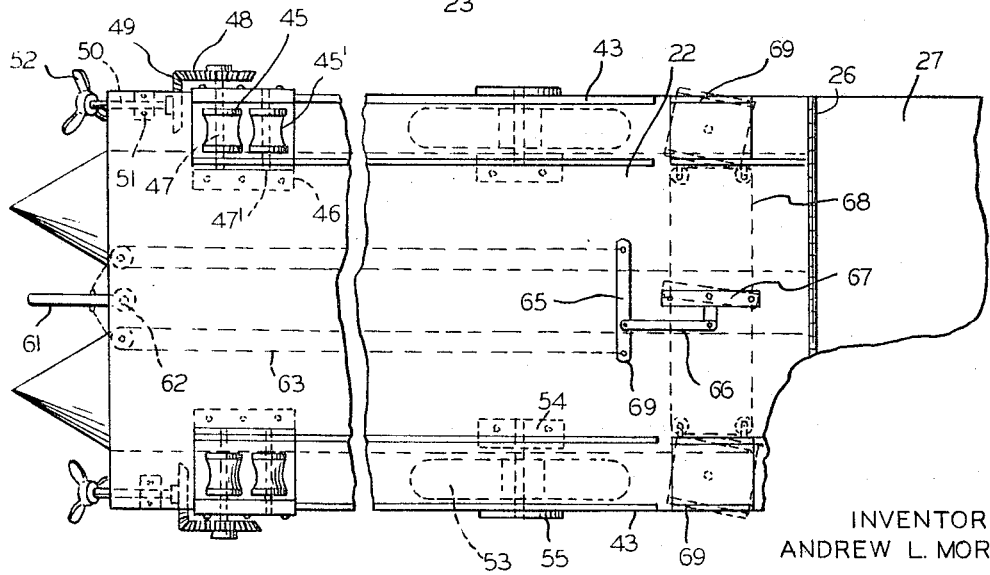

FIG. 4 is a front view of the barge in an extended position, taken on the plane of the line 4—4 in FIG. 1 and viewed in the direction indicated;

FIG. 5 is a view of the barge with the side floats brought inward, taken on the plane of the line 5—5 in FIG. 2 and viewed in the direction indicated;

FIG. 6 is a view of the barge in a folded position for towing, and taken on the plane of the line 6—6 in FIG. 3 and viewed in the direction indicated;

FIG. 7 is a top or plane view of the main body of the barge, showing the conventional driving and steering arrangement;

FIG. 8 is a fragmentary side view of the body of the device, showing the side floats disposed on the top thereof, in their relation with the loading float, ready for towing;

FIG. 9 is a fragmentary side view of the device showing the wheel mounted in position while the device is being towed;

FIG. 10 is a front fragmentary view of the wheel mounted as shown in FIG. 9;

FIG. 11 is a fragmentary side view of the propeller driving rollers in relation to the wheel of the automobile; and FIG. 12 is a fragmentary front view of the rollers in their relation with the wheel of the automobile.

Similar characters of reference indicate corresponding parts throughout the various views and referring now to the same, the reference character 20, shows generally the main body section of the barge having two side floats 21 hingedly attached thereto.

The main body section 20 comprises a main plate 22 with main floats 23 attached to the underside thereof. Float portions 23 may be of any type and are shown as tubular in design and equipped with conical ends 24. The side floats 21 are shown similar in design, however, the side or main floats 21, 23 may be of any form, shape or contour.

Hinges 25 attach the side floats 21 to the main body section 20, which attachment will be further described in detail.

The forward end of the main plate 22 includes a hinge 26 to support the loading platform 27. Loading platform 27 is also constructed of buoyant material and is tapered at 28 (see FIG. 8). The loading platform 27 contacts the forward ends of the floats 23 when the platform 27 is in a down or operative position.

The platform 27 may also include a rigid board 29 to provide rigidity for the loading platform 27 while it is being loaded.

The side floats 21 are shown tapered at 30 (see FIG. 8) to accommodate the loading platform 27 while the automobile barge and trailer is being towed by means of any type of trailer hitch shown as 31 in FIG. 3. The side floats 21 have support boards 32 (see FIGS. 4 and 5).

The main floats 23 are attached to the main plate 22 by means of brackets 33 (FIG. 4) and the side floats 21 are attached to the side boards 32 by brackets 34. Brackets 33 and 34 may be of any conventional design to fit the attachment.

There are a pair of side boards 35 (FIGS. 4 and 5), shown hingedly attached to the main plate 22 of the main body section 20, by means of hinges 36. Side boards 35 extend over the open portion between the main section 20 and the side float 21 when the automobile barge and trailer is in an extended position (see FIG. 4), and fold to a position above the main plate 22 when in a retracted or non-operative position (see FIGS. 5 and 6).

FIGS. 1, 2, 4 and 5 show a means of hingedly attaching the support boards 32 to the main plate 22, however, any other efficient method may be employed. The method shown includes hinged brackets 37 (FIGS. 4 and 8) attached at 38 to downwardly extending members 39 which are attached to the main plate 22. The brackets 37 support a pivoted block 40 equipped with an aperture for slidable engagement with a rod 41 extending longitudinally and attached to the support boards 32 and the blocks 40, support an angularly disposed hinge member 42. In this manner the hinged brackets 37 permit the side surface boards 32 to be brought toward the main plate board 22 (see FIG. 5), and folded upward to rest onto the hingedly support side boards 35 (see FIG. 6).

In FIG. 7 a schematic layout is shown, in which the main plate 22 of the main body section 20 is equipped with channels 43 to guide the automobile (not shown), as it is backed onto the main plate 22 over the loading platform 27.

The rear wheels of the vehicle will be guided by the channels 43 and come to rest onto the pulleys 45 and 45' supported in bearings 46 (see FIGS. 11 and 12), in a conventional manner.

The pulley 45 mounted on the shaft 47, is shown equipped with a bevel gear 48 (see FIG. 7) which in turn engages the bevel gear 49 mounted on the shaft 50 supported by the bearing 51 and equipped with the propeller 52 (see FIGS. 7 and 11). This assembly is of the conventional type to accommodate two propellers, one on each side of the unit.

The entire assembled unit as a tractor being towed by the automobile (not shown), is equipped with a pair of wheels 53 (see FIG. 7), which wheels are supported by bearings 54 attached to the main plate 22 (see FIGS. 9 and 10), and pivotally supported on downwardly extending vertical members 55 and 56. Vertical member 55 (see FIG. 9) is shown equipped with hinged supports 57 leading from the pivot point 58 on the vertical member 55 to a pivot point 59 which is attached to member 60 extending downward from the main plate 22, to enable the wheels 53 to be manually raised above the lower surface of the buoyant floats 21, 23.

In FIG. 7, I also show a rudder 61, pivotally mounted to the main plate 22 at 62 and cords 63 lead to a lever 64, pivoted at 65 onto the board 22, and a link 66 actuates a lever 67 which has the cord 68 attached thereto to pivot the lever 67 when the channel sections 69 onto which the front wheels of the vehicle are disposed are moved in either direction when the front wheels of the vehicle are being steered in the usual manner by the operator of the automobile.

Obviously, there are various methods that may be employed for the manipulation of the rudder 61 while the entire device is being propelled on the surface of the water.

From the above description, it will become manifest that the automobile barge and trailer may be increased in buoyancy, by extending the side floats outwardly. Furthermore these side floats may be folded upward over the main body section 20. Moreover, the entire folded unit may be towed as a trailer behind the automobile, thereby eliminating an extra trailer. Also the automobile barge and trailer herein includes a loading platform that permits the automobile or vehicle which is used to pull the barge to be backed thereon and the actuation of the barge will be governed both in forward and the rear direction by the manipulation of the automobile in the conventional manner.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claim.

What I claim and desire to secure by Letters Patent of the United States is:

A combination barge and trailer including:
a main plate,
a main float attached to the underside of said main plate;
side floats being hingedly associated with opposite sides of said main plate and having an operative position to the side of said main plate to increase the buoyant force of said combination, said floats being foldable from said operative position to a non-operative position above said main plate;
side boards that are hingedly attached to said main plate at the sides thereof, said side boards extending outwardly to the side of said main plate in an operative position to increase the width of the combination automobile barge and trailer and the buoyant force for the same, said side boards being foldable from their operative position to a non-operative position above said main plate when the combination automobile barge and trailer is used as a trailer;
a platform hingedly associated with the forward end of said main plate, said platform extending outward from the forward end of said main plate in an operative position to provide a loading surface for said automobile and to extend the length of said combination barge and trailer when used as a barge for increasing the buoyant force, said platform being foldable from said operative position to a non-operative position above said main plate;
said main plate including channels adjacent the side edges thereof to guide an automobile on said main plate;
drive means being operatively associated with said main plate, each of said drive means including a pulley having a first bevel gear engaging a second bevel gear, said second bevel gear having a propeller extending outward therefrom and into the water, the rear wheels of the automobile operatively positioned on said pulley to rotate the same and cause responsive rotation of said propeller;
steering means operatively associated with said main plate, the front wheels of said automobile being operatively associated with said steering means whereby the turning of said front wheels cause responsive turning of said steering means to change the direction of said combination automobile barge and trailer when used as a barge;
and wheels attached to said main plate to permit said combination automobile barge and trailer to be used as a trailer attached to an automobile when said side floats are in the non-operative position.

References Cited

UNITED STATES PATENTS

| | | | |
|---|---|---|---|
| 2,759,201 | 8/1956 | McKinney | 9—1 |
| 3,076,425 | 2/1963 | Anderson | 115—0.5 |
| 3,152,569 | 10/1964 | Gehlen et al. | 115—1 |

FOREIGN PATENTS

| | | |
|---|---|---|
| 1,201,732 | 7/1959 | France. |
| 1,103,793 | 10/1958 | Germany. |
| 922,145 | 3/1963 | Great Britain. |

MILTON BUCHLER, *Primary Examiner.*

ANDREW H. FARRELL, *Examiner.*